(12) United States Patent
Xu et al.

(10) Patent No.: US 10,877,836 B2
(45) Date of Patent: Dec. 29, 2020

(54) METHOD AND APPARATUS FOR COHERENT INTERCONNECT RECOVERY WITH PROTOCOL LAYER RE-TRANSMISSION

(71) Applicant: Arm Limited, Cambridge (GB)

(72) Inventors: Zheng Xu, Austin, TX (US); Jamshed Jalal, Austin, TX (US)

(73) Assignee: Arm Limited, Cambridge (GB)

( * ) Notice: Subject to any disclaimer, the term of this patent is extended or adjusted under 35 U.S.C. 154(b) by 122 days.

(21) Appl. No.: 16/116,017

(22) Filed: Aug. 29, 2018

(65) Prior Publication Data
US 2020/0073749 A1 Mar. 5, 2020

(51) Int. Cl.
*G06F 11/07* (2006.01)
*G06F 13/362* (2006.01)

(52) U.S. Cl.
CPC ...... *G06F 11/0793* (2013.01); *G06F 11/0745* (2013.01); *G06F 13/362* (2013.01)

(58) Field of Classification Search
CPC . G06F 11/0793; G06F 11/0745; G06F 13/362
See application file for complete search history.

(56) References Cited

U.S. PATENT DOCUMENTS

| | | | | |
|---|---|---|---|---|
| 5,630,095 A * | 5/1997 | Snyder | ................ | G06F 12/0831 365/49.1 |
| 7,856,534 B2 * | 12/2010 | Van Doren | ......... | G06F 12/0831 711/141 |
| 2004/0123045 A1 * | 6/2004 | Hum | ................... | G06F 12/0813 711/141 |
| 2004/0193809 A1 * | 9/2004 | Dieffenderfer | ...... | G06F 12/0831 711/146 |
| 2004/0236888 A1 * | 11/2004 | Dieffenderfer | ...... | G06F 13/4217 710/112 |

(Continued)

OTHER PUBLICATIONS

A. Pullini, F. Angiolini, D. Bertozzi and L. Benini, "Fault Tolerance Overhead in Network-on-Chip Flow Control Schemes," 2005 18th Symposium on Integrated Circuits and Systems Design, Florianopolis, 2005, pp. 224-229 (Year: 2005).*

(Continued)

*Primary Examiner* — Matthew M Kim
*Assistant Examiner* — Kurosu Risa Altaf
(74) *Attorney, Agent, or Firm* — Leveque IP Law, P.C.

(57) ABSTRACT

A fault tolerant data processing network includes a number of nodes intercoupled through an interconnect circuit. The micro-architectures of the nodes are configured for sending and receiving messages via the interconnect circuit. In operation, a first Request Node sends a read request to a Home Node. In response, the Home Node initiates transmission of the requested data to the first Request Node. When the first Request Node detects that a fault has occurred, it sends a negative-acknowledgement message to the first Home Node. In response, the Home Node again initiates transmission of the requested data to the first Request Node. The requested data may be transmitted from a local cache of a second Request Node or transmitted by a Slave Node after being retrieved from a memory. The data may be transmitted to the first Request Node via the Home Node or directly via the interconnect.

16 Claims, 10 Drawing Sheets

(56) References Cited

U.S. PATENT DOCUMENTS

| | | | |
|---|---|---|---|
| 2008/0243739 A1* | 10/2008 | Tsien | G06F 12/0826 706/21 |
| 2009/0235138 A1 | 9/2009 | Chang et al. | |
| 2012/0002677 A1* | 1/2012 | Hataida | H04L 49/101 370/412 |
| 2012/0311512 A1* | 12/2012 | Michel | G06F 30/3312 716/104 |
| 2013/0042077 A1* | 2/2013 | Mannava | G06F 12/0831 711/146 |
| 2013/0121296 A1 | 5/2013 | Jung et al. | |
| 2016/0224468 A1* | 8/2016 | Deshpande | G06F 12/0813 |
| 2017/0168939 A1* | 6/2017 | Jalal | G06F 12/0815 |

OTHER PUBLICATIONS

S. Murali, T. Theocharides, N. Vijaykrishnan, M. J. Irwin, L. Benini and G. De Micheli, "Analysis of error recovery schemes for networks on chips," in IEEE Design & Test of Computers, vol. 22, No. 5, pp. 434-442, Sep.-Oct. 2005 (Year: 2005).*

* cited by examiner

METHOD AND APPARATUS FOR COHERENT INTERCONNECT RECOVERY WITH PROTOCOL LAYER RE-TRANSMISSION

BACKGROUND

A multi-processor data processing system may be arranged as an on-chip network with nodes of various types, such as processors, accelerators, IO, and memory, connected via an interconnect fabric.

Data from a shared data resource, such as a memory, may be accessed by a number of different processors and copies of the data may be stored in local caches for rapid access. A cache coherence protocol may be used to ensure that all copies are up to date. The protocol may involve the exchange of messages between nodes of the network.

A coherence protocol however, may fail when a request or response is lost. The failure mechanism may involve silent data corruption, inconsistent or incoherent memory operations, dropped request/response messages, deadlock or livelock, for example.

Accordingly, there exists a need for a coherence protocol that includes a mechanism for recovering from errors.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
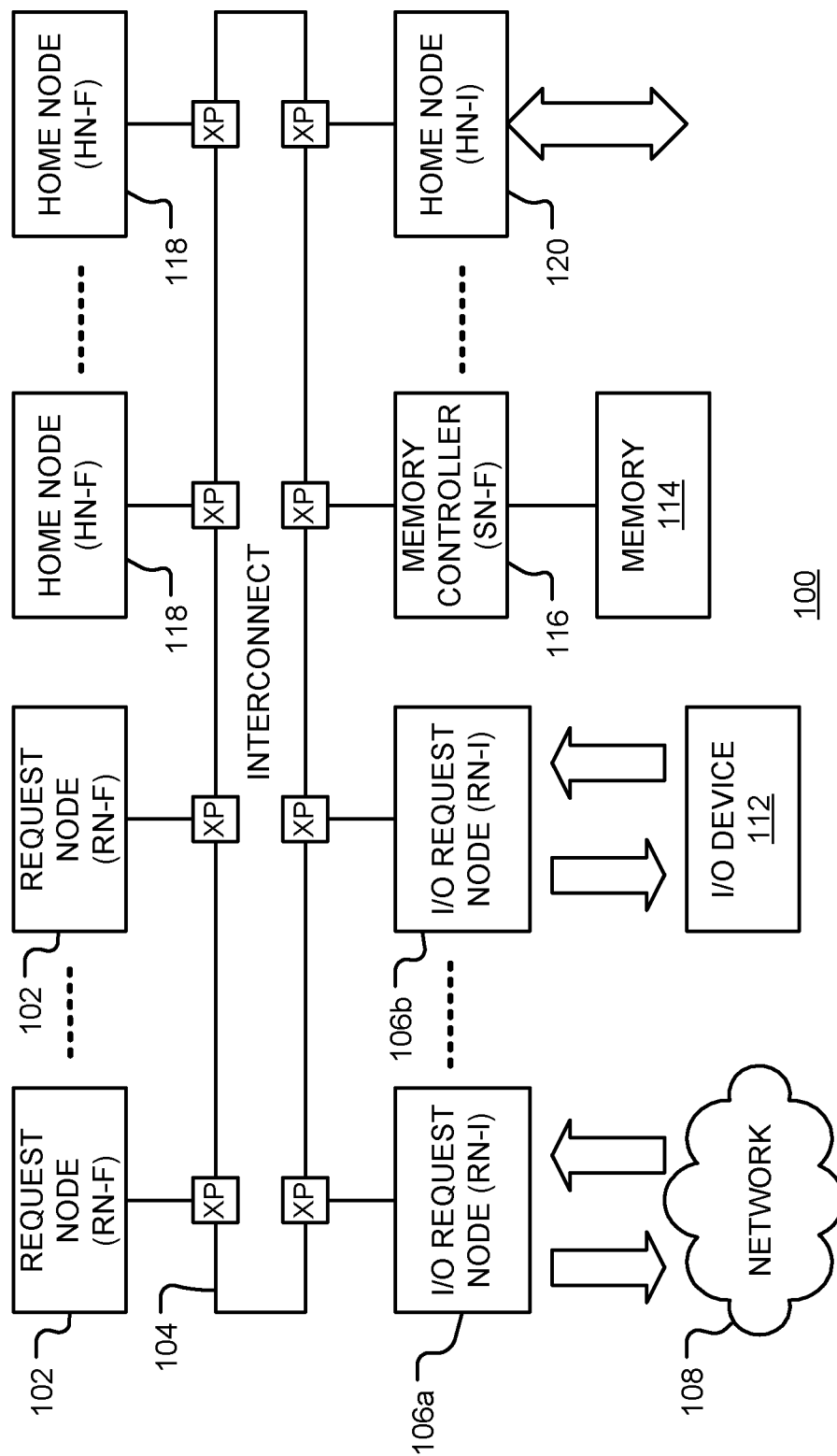
FIG. 1 is a block diagram of a data processing system, in accordance with various representative embodiments.

In accordance with certain representative embodiments of the present disclosure, there is provided a protocol layer re-transmission mechanism for a fault tolerant coherent interconnect architecture of a data processing network. The mechanism extends functional coherent protocols with error resilient response packets at selective points of the transaction flow to provide improved fault tolerance. The mechanism may be implemented by extending the structure of existing protocol-level retry hardware. Snoop and request replay are also introduced to reduce the fault recovery latency.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the embodiments described herein.

In accordance with certain representative embodiments of the present disclosure, there is provided a re-transmission mechanism for a fault tolerant coherent interconnect architecture. The mechanism is implemented in the protocol layer of a data processing network and extends existing functional coherent protocols by introducing error resilient response messages at selective point of the transaction flow to provide improved fault tolerance.

In a Network-on-a-Chip (NoC), error recovery may be implemented using a Protocol Layer re-transmission mechanism. The present disclosure extends this mechanism for use when the NoC is implemented using a coherent interconnect. In contrast to a standard, non-coherent protocol, a coherent protocol requires Snoop tenure in addition to Request and Data tenure. Herein, 'tenure' refers to a specific part of the transaction flow. For example, a coherent transaction flow may be partitioned into request tenure, snoop tenure and response tenure. In order to be able to re-transmit messages, the original message must be retained until it is known that no fault has occurred. When a fault is indicated, through a NACK message for example, the entire transaction flow may be restarted from the beginning of the transaction. For example, if an error occurs during snoop tenure, the transaction is restarted with the request tenure.

A data processing network, such as a Network-on-a-Chip, may include the following elements:

Fully-coherent Request Node (RN-F): A fully-coherent master device such as a CPU core or core cluster. A Request Node is a node that generates protocol messages, including reads and writes, to the network interconnect.

I/O-coherent Request Node (RN-I) Bridge: An input/output-coherent master device acting as a bridge to devices located behind the RN-I bridge.

Fully-coherent Home Node (HN-F): A device that is a Home Node for a designated region of memory, accepting coherent read and write requests from RN-Fs and generating snoops to all applicable RN-Fs in the system as required to support the coherency protocol. A Home Node receives protocol messages from RNs. Each address in the system has a Home which acts as the Point-of-Coherency (PoC) and Point of Serialization (PoS) for requests to that address. In a typical implementation, Homes for a range of addresses are grouped together as a Home Node. Each of these Home Nodes may include a system level cache and/or a snoop filter to reduce redundant snoops.

I/O Home Node (HN-I): A device that acts as a home-node for a memory mapped slave I/O subsystem, mainly responsible for ensuring proper ordering of requests sent into the slave I/O subsystem.

Fully-coherent Slave Node (SN-F): A fully-coherent device, such as a memory controller, that communicates with one or more HN-Fs that is solely a recipient of commands, limited to fulfilling simple read and write commands. A Slave Node receives and completes requests from Home Nodes and can be used for peripheral or main memory.

Protocol: The nodes exchange data and other information in messages according to a set of rules or procedures referred to as a protocol. Each message is sent as one or more information packets across the network interconnect fabric. The protocol may be implemented in the micro-architecture of the nodes, for example. An example of a coherent protocol is the Arm® AMBA® coherent hub interface (CHI) protocol of Arm Limited.

Transaction: A transaction, such as a read or write transaction, typically involves the exchange of multiple messages as specified in a given protocol.

FIG. 1 is a block diagram of a data processing system 100, in accordance with various representative embodiments. A number of processing core clusters 102 (referred to as Request Nodes (RN's)) are coupled to data resources via coherent interconnect 104. Data is received via input/output (I/O) requesting nodes (RN-I). In the example shown, RN-I 106a comprises a network interface controller (NIC) that receives data from network 108 and RN-I 106b receives data from I/O device 112. I/O device 112 may be coupled via a peripheral component interconnect express (PCIe) bus, direct memory access (DMA) unit, or network accelerator, for example. Data may be stored in one or more memory or storage devices 114 that are coupled to coherent interconnect 104 via one or more memory controllers or Slave Nodes 116. Home Nodes (HN) 118 and 120 may include system level caches. Each Home Node (HN) serves as a point of serialization and/or point of coherence for data stored at a given set of system addresses. A Home Node (HN-F), such as 118, may be a home for memory storage resources, while a Home Node (HN-I), such as 120, may provide an interface to memory mapped space or I/O resources. Data requested by a Request Node 102 may be retrieved from a system level cache of the HN or from a memory 114 via a memory controller 116. The memory controllers are referred to as Slave Nodes (SN's).

To avoid conflicts when multiple RNs try to access the same memory location, the Home Nodes 118 act as point of serialization, processing read requests and other transactions in a serial manner, such as first-come, first-served. Coherent interconnect 104 is used to transfer data over data (DAT) channels between nodes. In addition, a messaging protocol is used to control each access transaction, in which requests and responses are sent over request (REQ) and response (RSP) channels in the interconnect. Finally, 'snoop' messages are sent over snoop (SNP) channels in the interconnect to ensure data coherence.

In accordance with an aspect of the disclosure, error information is combined with Data and Snoop responses between Home Nodes, Request Nodes and Slave Nodes of a network. In addition, acknowledgement (ACK) and repudiation or negative-acknowledgement (NACK) response packets are added to the protocol for certain events in the protocol transaction flow. In particular, methods and apparatus are disclosed for fault recovery in an interconnect circuit of a data processing network. In one embodiment, example, the method includes sending, by a first node of the data processing network, a protocol message to a second node of the data processing network via the interconnect circuit, and detecting, by the second node, when a fault has or has not occurred in the protocol message. The second node sends a negative-acknowledgement message to the first node when a fault has occurred in the protocol message and sends an acknowledgement message to the first node when no fault has occurred in the protocol message. Responsive to the negative-acknowledgement message, the first node may re-transmit the protocol message to the second node.

An acknowledgement or negative-acknowledgement message may be combined with an expected response to the protocol message. Alternatively, when an error occurs, an expected response, such as a Data Response (DataResp) and/or Snoop Response (SnpResp) message, may be replaced with a simple Error Response message.

In general, a coherence protocol is augmented to ensure that, at appropriate steps of a transaction flow, a message produces either an implicit response packet or an explicit ACK/NACK response packet before proceeding to next step of the transaction flow.

In one embodiment, for example, data (such as data provided in response to a snoop request) from a Request Node (RN-F) is explicitly acknowledged in order for the RN-F to determine when to reliably deallocate data or change a cache state of the data. While it is not required to acknowledge data from a Slave Node (SN-F) as there is no impact on coherency, it may be desirable to explicitly acknowledge all data for a consistent approach.

Snoop tenure in a Home Node is always in a closed loop with a functional protocol. For example, a loop may be closed by a completion acknowledgement (CompACK) from the Request Node back to the Home Node. Thus, there is no need to send an additional ACK/NACK to the Home Node. The Home Node will deallocate the snoop entry if all responses and CompACK messages indicate that no errors have occurred.

Requests may be acknowledged implicitly, since each request will inherently cause a response. Further, a protocol layer acknowledgment, such as a CompACK message, is explicitly acknowledged in order for the Request Node to determine when to reliably deallocate the request entry.

Figure 2:
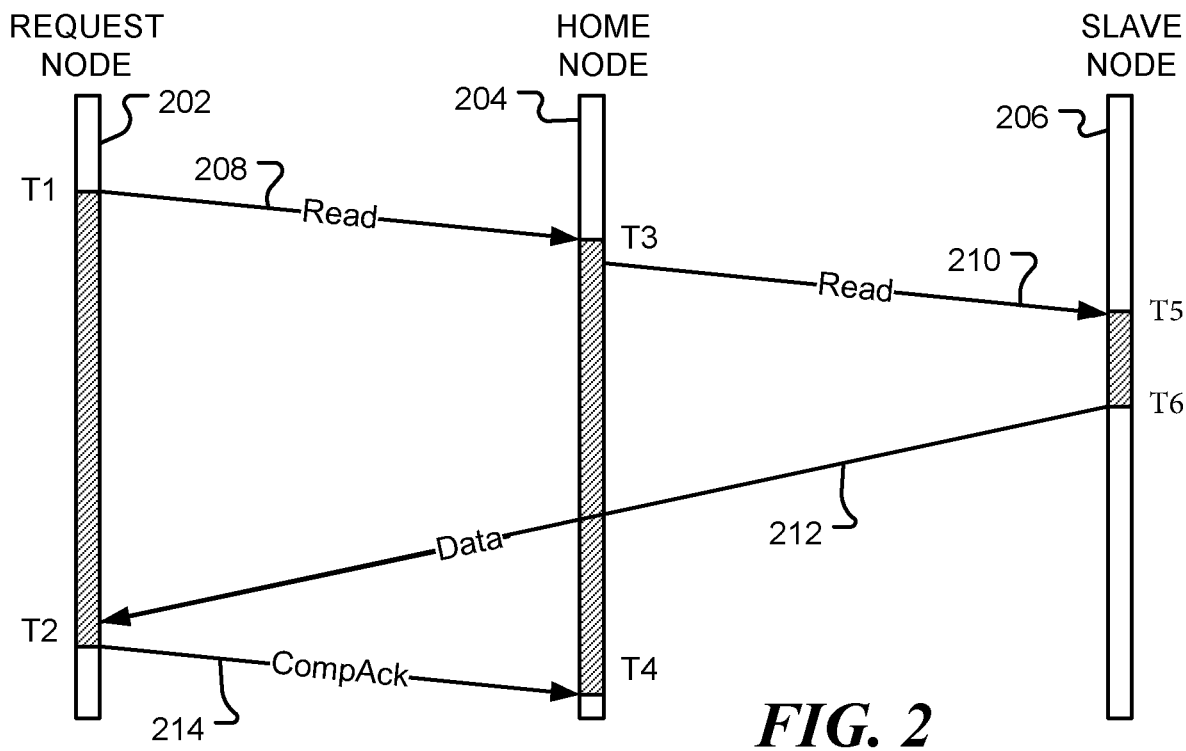
FIG. 2 is a transaction flow diagram for a conventional data access in a data processing network.

FIG. 2 is a transaction flow diagram for a conventional data access in a data processing network. In FIG. 2, vertical bars 202, 204 and 206 show time lines for a Request Node, Home Node and Slave Node, respectively, with time flowing from top to bottom. At time T1, the Request Node issues Read request 208 to the Home Node for data associated with a data address. If the request data is not in the cache of the Home Node, first slave read request 210 is sent to the appropriate Slave Node. The Slave Node sends the requested data 212 to the Request Node. All communications are transmitted via the interconnect fabric. The data may be transmitted to the Request Node in multiple data beats across the interconnect. Once all of the requested data has been received by the Request Node, a completion acknowledgment (CompAck) message 214 is sent from the Request Node to the Home Node. Thus, the duration of the transaction is T1-T2 for the Request Node, T3-T4 for the Home Node, and T5-T6 for the Slave Node.

Figure 3:
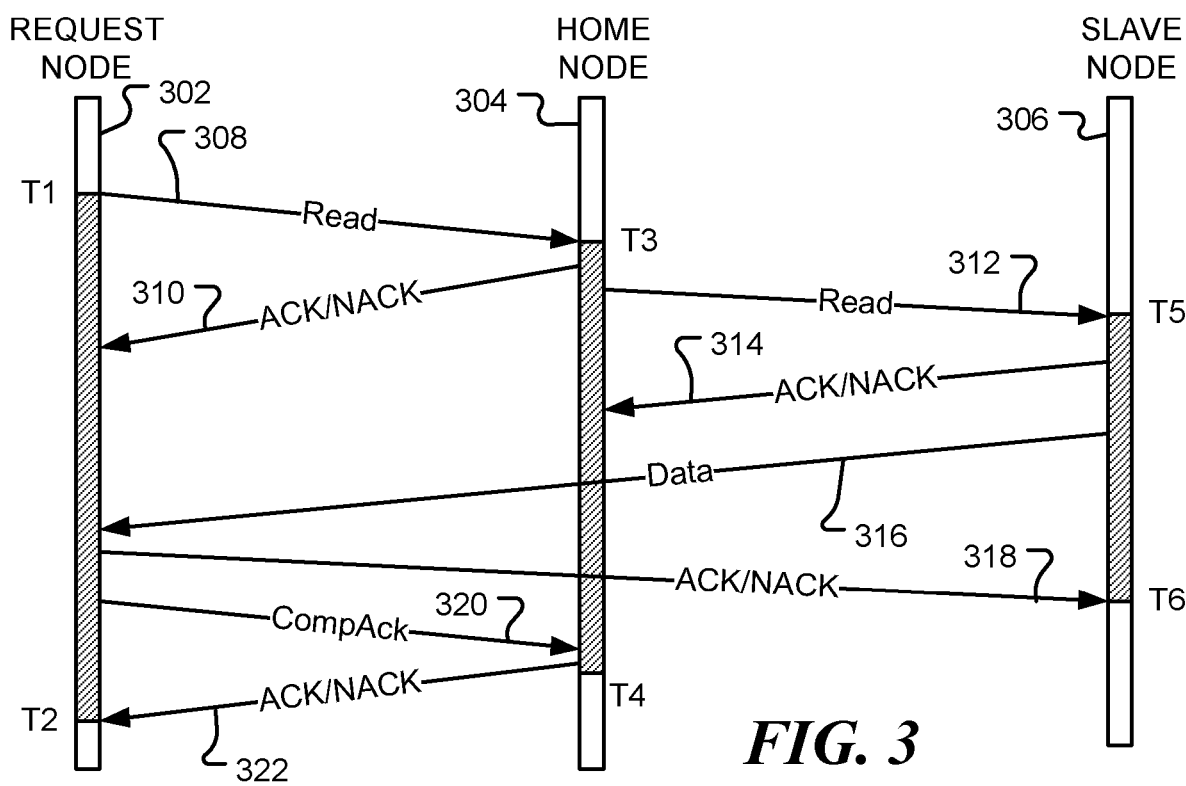
FIGS. 3, 4 and 5 are transaction flow diagrams for data read transactions in a data processing network, in accordance with various representative embodiments.

FIG. 3 is a transaction flow diagram for a data read transaction in a data processing network, in accordance with various representative embodiments. In FIG. 3, vertical bars 302, 304 and 306 show time lines for a Request Node, Home Node and Slave Node, respectively, with time flowing from top to bottom. At time T1, the Request Node issues Read request 308 to the Home Node for data associated with a data address. The Home Node sends an acknowledgement (ACK) in response 310 when the Read request is received without error and the Home Node is able to process the request, otherwise a repudiation or negative-acknowledgement (NACK) is sent in response 310. If the requested data is not in the cache of the Home Node, first slave Read request 312 is sent to the appropriate Slave Node. The Slave Node sends an acknowledgement or negative-acknowledgement in ACK/NACK response 314 to the Home Node and sends the requested data to the Request Node in Data response 316. All communications are transmitted via the interconnect fabric. The data may be transmitted to the Request Node in multiple data beats across the interconnect. Once the requested data has been received by the Request Node (possibly in multiple data beats), the Request Node sends an acknowledgement or negative-acknowledgement to the Slave Node in ACK/NACK response 318 and sends a completion acknowledgment (CompAck) message 320 to the Home Node. Finally, on receipt of message 320, the Home Node sends an acknowledgement or negative-acknowledgement in ACK/NACK response 322 to the Request Node. In this manner, an explicit acknowledgement or negative acknowledgement is sent in response to each step of the read transaction. The duration of the transaction is T1-T2 for the Request Node, T3-T4 for the Home Node, and T5-T6 for the Slave Node. While these durations may be in excess of corresponding durations for a conventional Read transaction, the protocol depicted in FIG. 3 provides improved fault tolerance.

If the requested data is present in the cache of the Home Node, the data may be sent directly from the Home Node to the Request node and no messages are exchanged with the Slave Node.

Figure 4:
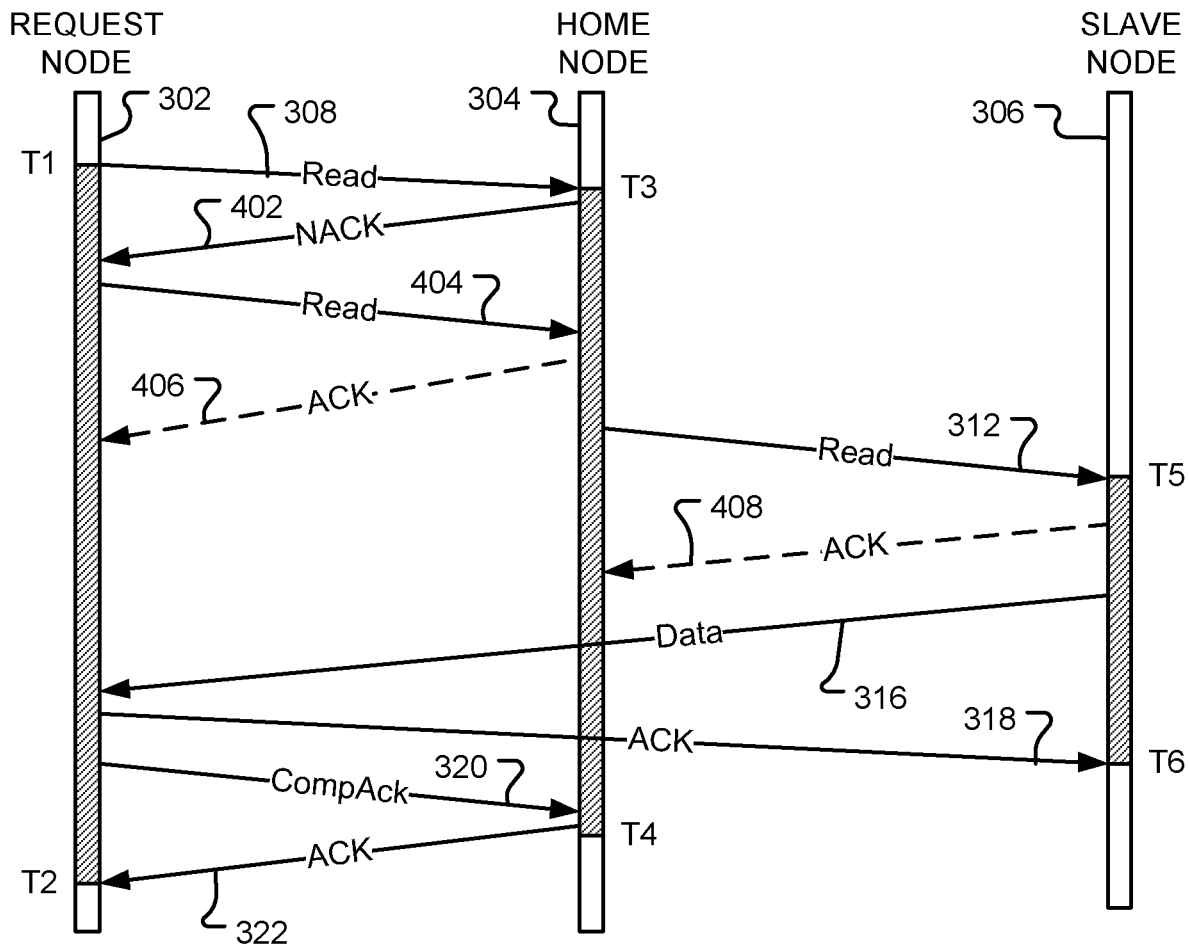

FIG. 4 is a further transaction flow diagram for a data read transaction in a data processing network, in accordance with various representative embodiments. In the transaction shown, the Home Node sends a repudiation in NACK response 402, indicating an error in the original Read request 308 or that the Home Node is unable to process the request. In response to NACK response 402, the Request Node re-transmits the Read request in message 404. Optionally, in response to the resent Read request 404, the Home Node may send ACK response 406 indicating successful receipt of request 404. However, ACK response 406 may be omitted since ACK response 322 indicates success of the read operation to the Request Node. The read operation then continues as in FIG. 3, assuming that all subsequent messages are received without error. However, ACK response 408 may be omitted since, again, ACK response 322 indicates success of the complete read operation to the Request Node. When the requested data is not in the cache of the Home Node, first slave Read request 312 is sent to the appropriate Slave Node. The Slave Node sends an acknowledgement in ACK response 408 to the Home Node and sends the requested data to the Request Node in Data response 316. Once the requested data has been received by the Request Node, the Request Node sends an acknowledgement to the Slave Node in ACK response 318 and sends a completion acknowledgment (CompAck) message 320 to the Home Node. Finally, on receipt of message 320, the Home Node sends an acknowledgement in ACK response 322 to the Request Node.

Figure 5:
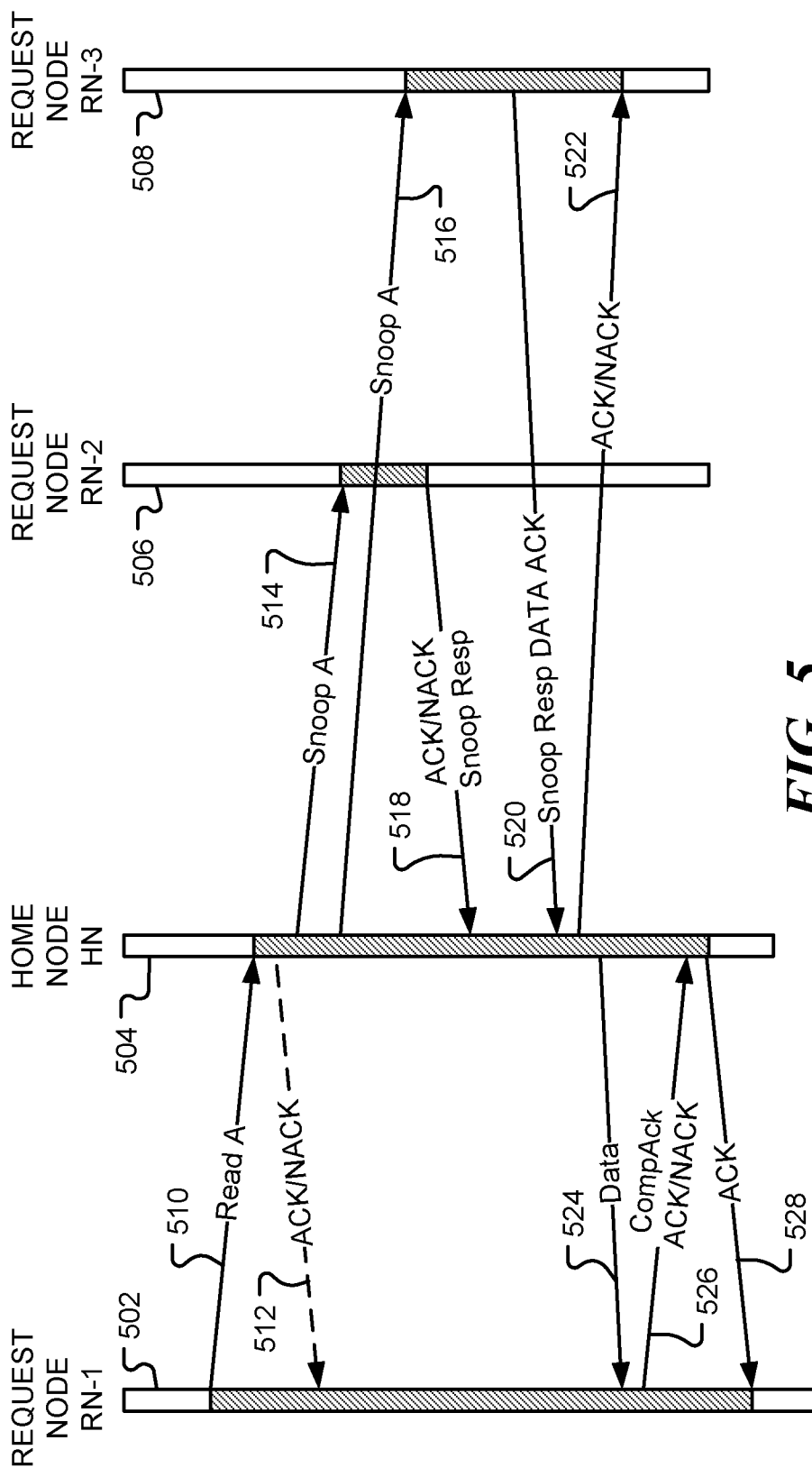

When the requested data is present in one or more local caches of Request Nodes, the Home Node sends snoop messages to those Request Nodes to maintain data coherency in the network. Faults occurring in these snoop messages, or the responses to them, can result in a loss of data coherence in the network. FIG. 5 is a further transaction flow diagram for a data read transaction in a data processing network, in accordance with various representative embodiments. In FIG. 5, vertical bars 502, 504, 506 and 508 show time lines for a first Request Node (RN 1), Home Node (HN), second Request Node (RN 2) and third Request Node (RN-3), with time flowing from top to bottom. The Request Node RN-1 issues Read request 510 to the Home Node for data associated with a data address. The Home Node sends an acknowledgement (ACK) in response 512 if the Read request is received without error and the Home Node is able to process the request, otherwise a repudiation (NACK) in response 512. The Home Node sends a first Snoop request 514 to the second Request Node and sends a second Snoop request 516 to the third Request Node. The second Request Node responds with response 518 to the Home Node that is a combination of an ACK/NACK response and a Snoop response. The third Request Node responds with response 520 to the Home Node that is an acknowledgement in combination with a Snoop response and the requested data. The Home Node acknowledges receipt of the data in ACK/NACK response 522 to the third Request Node. The Home Node then forwards to the data to the first Request Node in Data message 524 and the first Request Node acknowledges receipt of the data in combined ACK/NACK and completion acknowledgement message 526. More generally, Snoop messages are sent to each Request Node that is indicated to have a copy of the data in its local cache.

The protocol depicted in FIG. 5 combines conventional responses with ACK/NACK responses in responses 518, 520 and 526. This combination reduces the number of additional messages required to provide fault tolerance.

In general, the protocols shown in FIGS. 3-5 are combined depending upon where local copies of data are stored in the data processing system. In one example, for a simple read operation, the transaction flow is:

1) RN-F sends Read request (ReadReq) to HN-F (HN-F responds with ACK/NACK)
2) HN-F sends Snoop request (SnpReq) to each RN-F
3) Each RN-F responds with Snoop response (SnpResp) to HN-F (response combined with ACK/NACK)
4) HN-F sends Read no snoop (ReadNoSnp) to SN-F (SN-F responds with ACK/NACK)
5) SN-F sends data and notification of completion (CompData) back to RN-F (response combined with ACK/NACK)
6) RN-F sends acknowledgment and notification of completion (CompAck) back to HN-F (response combined with ACK/NACK)
7) HN-F sends ACK back to RN-F.

In another example, for a read operation where a snoop response includes partial data, the transaction flow is:

1) RN-F sends ReadReq (HN-F responds with NACK if error, optionally responds with ACK if no error)
2) HN-F sends SnpReq to each RN-F
3) Each RN-F responds with SnpResp to HN-F (response combined with ACK/NACK)
4) The Owner RN-F can send Snoop response with partial data (SnpRespDataPtl) back to HN-F (response combined with ACK/NACK)
5) HN-F sends CompData back to RN-F (response combined with ACK/NACK)
6) RN-F sends CompAck back to HN-F (response combined with ACK/NACK).
7) HN-F sends ACK back to RN-F.

Figure 6:
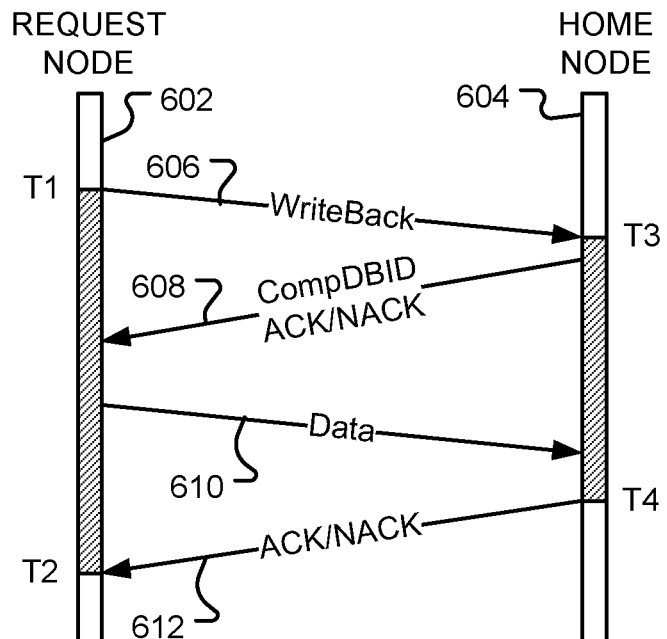
FIG. 6 is a transaction flow diagram for a data write-back transaction in a data processing network, in accordance with various representative embodiments.

FIG. 6 is a transaction flow diagram for a data write-back transaction in a data processing network, in accordance with various representative embodiments. In FIG. 6, vertical bars 602 and 604 show time lines for a Request Node and a Home Node respectively, with time flowing from top to bottom. The Request Node issues Write-back request 606 to the Home Node indicating a request to write-back data to a specified address in memory. Home Node responds with message 608. When no error occurs, message 608 may be a combination of a Write Data Buffer credit message (CompDBID) and an acknowledgement (ACK) message, acknowledging the Write-back request. The Write Data Buffer credit message (CompDBID) indicates the previous read/write requests and coherence management operations have completed and that resources are available at the Home Node to receive the data to be written back to memory. When an error occurs, message 608 may simply signal the error through a NACK message. When no error occurs, the Request Node sends the data to the Home Node in Data message 610 and the Home Node acknowledges or repudiates receipt of the data in ACK/NACK message 612. Whenever an error occurs it is indicated by a NACK message and the message may be resent. For example, when message 612 is a NACK message, the data message 610 may be resent.

Figure 7:
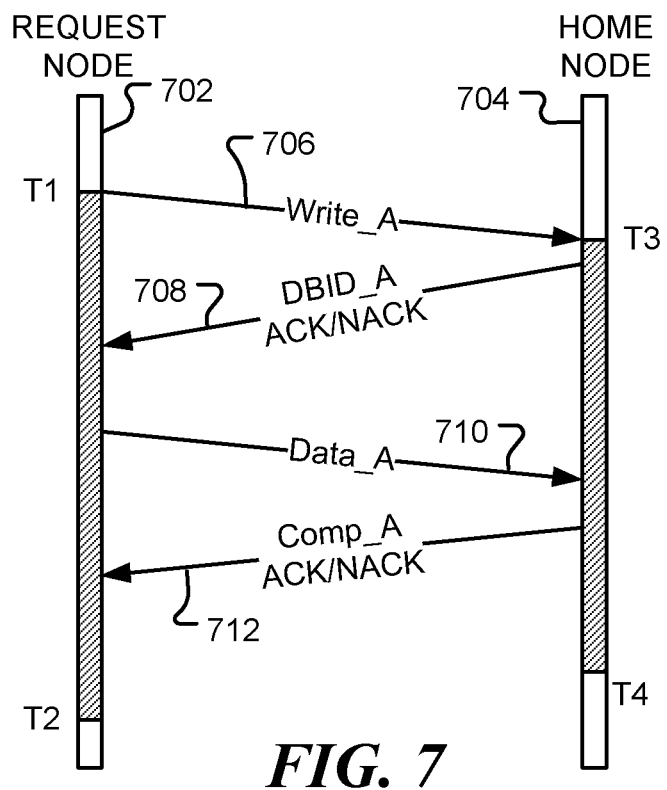
FIG. 7 is a transaction flow diagram for a data write transaction in a data processing network, in accordance with various representative embodiments.

FIG. 7 is a transaction flow diagram for a data write transaction in a data processing network, in accordance with various representative embodiments. In FIG. 7, vertical bars 702 and 704 show time lines for a Request Node and a Home Node respectively, with time flowing from top to bottom. The Request Node issues Write request 706 to the Home Node indicating a request to write-back data to address A. Home Node responds with message 708. When no error occurs, message 708 may be a combination of a Write Data Buffer credit message (DBID A) (indicating that a write buffer is available at the Home Node to receive the data to be written to memory) and an acknowledgement (ACK) message, acknowledging the Write request. When an error occurs, message 708 may simply signal the error through a NACK message. When no error occurs, the Request Node sends the data to the Home Node in Data message 710 and the Home Node responds with message 712. Message 712 is a combination of a completion message and a message that acknowledges or repudiates receipt of the data. Whenever an error occurs it is indicated by a NACK message and the message may be re-transmitted. For example, when message 708 is a NACK message, Write request 706 may be re-transmitted.

In accordance with certain embodiments, an additional check-point is introduced in the protocol after each tenure (request, snoop and data) such that an Error Response can be sent to requestor earlier if there is any error in either a Data request and/or a Snoop request/Snoop response handshake. Depending on the response packet information, the Request Node can choose to replay the transaction or not.

A Request Node may be implemented with a protocol level retry micro-architecture so as to reduce the required data buffer size in the Home Node and to minimize round trip latency between Request Node and Home Node buffer allocation.

Protocol level retry micro-architecture typically retains the request address, attributes and other data information at the requester. In one embodiment, the protocol-level retry hardware structure is utilized to provide error resiliency and enable implementation of a low cost fault tolerant coherency interconnect.

A Snoop retry (SnpRetry) message may be introduced for the Home Node (instead of Requestor) at the point of coherency in order to reduce recovery latency further when an error is detected. When errors are detected in either the Snoop request or Snoop response packets, error information may be included in the Snoop response packet and sent back to the Home Node. Depending on the information in the Snoop response packet information, a Home Node can choose to replay the Snoop tenure again. It is noted that the Home Node possesses at the minimum information (such as address and attribute information) to enable Snoop replay, thereby minimizing the additional cost of replaying the Snoop Requests. It is also noted that, since a Snoop request is fully tagged, it could be sent to a different Request Node and combined at the Home Node out of order. However, for each cache line address, there should be no more than one Snoop in the system at any given time. This reduces the number of replays required for error resiliency.

The technique described above does not affect the functional correctness of a data processing system with Snoop requests included. It is only necessary to replay the transactions which failed Snoop tenure. However, since the additional ACK/NACK response packets in the protocol place additional constraints on when the requestor can release its buffers, there is a trade-off between performance and fault resiliency.

Figure 8:
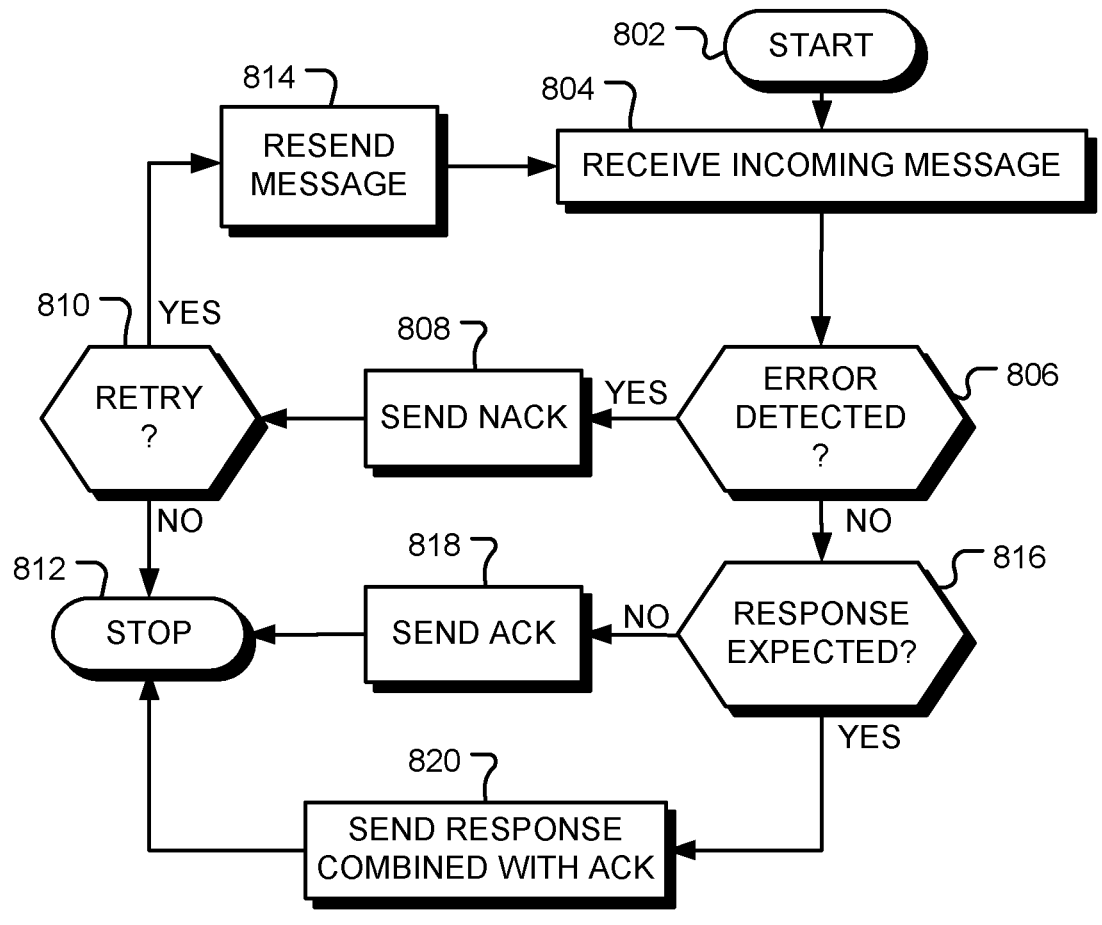
FIG. 8 is a flow chart of a method for coherent interconnect recovery with protocol layer re-transmission, in accordance with certain representative embodiments.

FIG. 8 is a flow chart of a method 800 for coherent interconnect recovery with protocol layer re-transmission in accordance with certain embodiments. Following start block 802, a message sent by a first node coupled to the coherent interconnect, is received by a second node coupled to the coherent interconnect at block 804. If an error or fault is detected, as depicted by the positive branch from decision block 806, the message is repudiated by sending a negative-acknowledgement (NACK) response at block 808 back to the first node. Upon receiving the NACK message, the first node determines if the transaction should be retried. If it is determined that the transaction should not be retried, as depicted by the negative branch from decision block 810, the method terminates at block 812. Otherwise, as depicted by the positive branch from decision block 810, the original message is re-transmitted by the first node at block 814 and flow returns to block 804.

When no error or fault is detected, as depicted by the negative branch from decision block 806, flow continues to decision block 816. When, in the underlying non-fault tolerant protocol, no response is expected from the message received, an acknowledgement is sent by the second node back to the first node at block 818 to acknowledge the message. Conversely, when, in the underlying non-fault tolerant protocol, a response is expected from the message received, an acknowledgement is combined with the expected response at block 820 and the combined response is sent by the second node back to the first node. In a further embodiment, the NACK message sent at block 808 is combined with any expected response. In this manner, any detected fault in a transaction step is signaled to the message sender, enabling the message sender to re-transmit the message if so desired. This provides a mechanism by which faults may be overcome.

FIGS. 9-12 are transaction flow diagrams for data read transactions involving transaction replay in a data processing network, in accordance with various representative embodiments.

Figure 9:
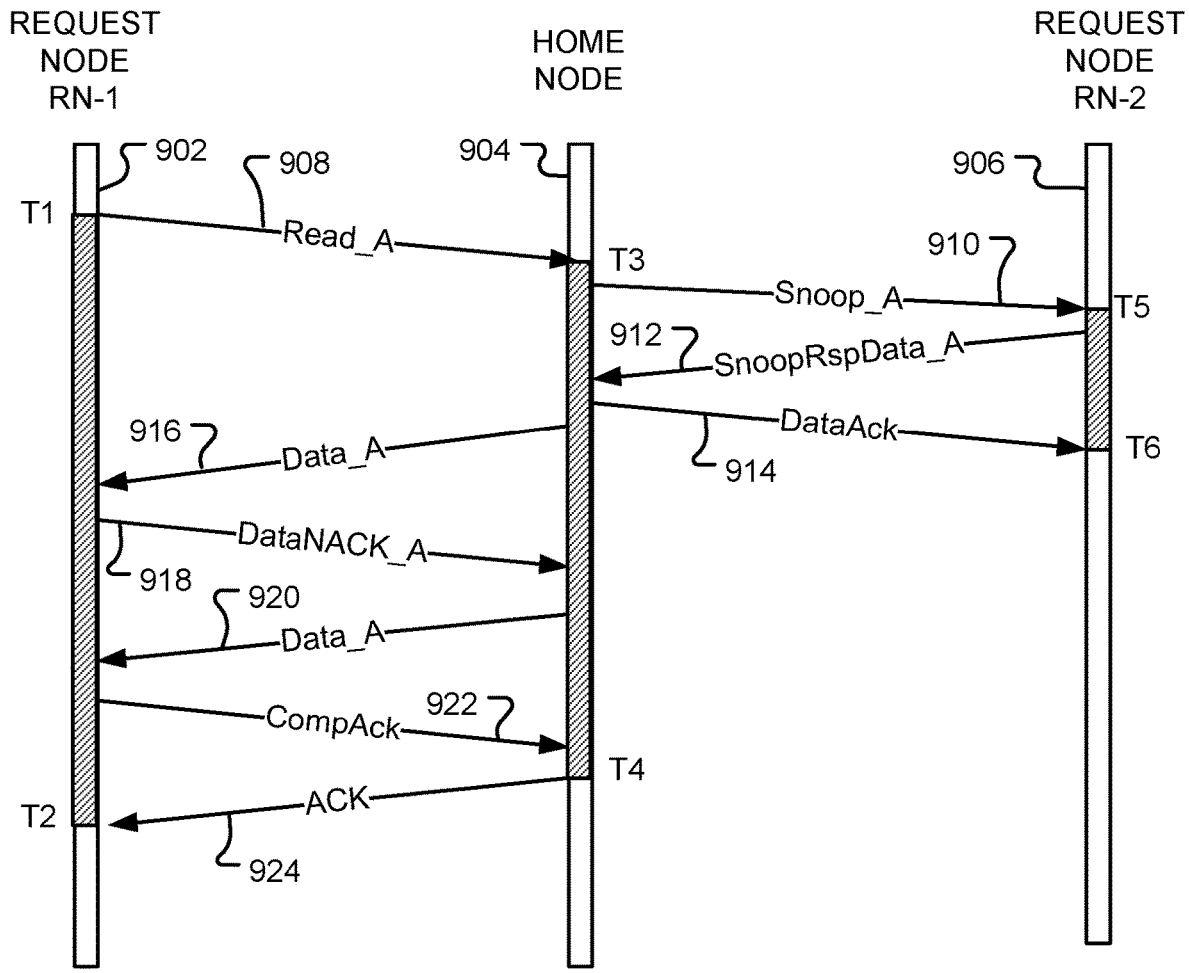
FIGS. 9-12 are transaction flow diagrams for data read transactions involving transaction replay in a data processing network, in accordance with various representative embodiments.

FIG. 9 is a transaction flow diagram for a data read transaction, where the requested data is stored in a cache of a Request Node. In FIG. 9, vertical bars 902, 904 and 906 show time lines for a first Request Node (RN 1), Home Node (HN) and second Request Node (RN 2), respectively, with time flowing from top to bottom. The Request Node RN-1 issues Read request 908 to the Home Node for data associated with a data address 'A'. The Home Node sends a Snoop request 910 to the second Request Node. The second Request Node responds with response 912 to the Home Node that is an acknowledgement in combination with a Snoop response and the requested data. The Home Node acknowledges receipt of the data in acknowledgement 914 to the second Request Node. The Home Node then forwards to the data to the first Request Node in Data message 916. In this example, an error occurs and the first Request Node sends a no-acknowledgement in message 918. In response, the Home Node resends the data in message 920. This time, the data is received without error and the first Request Node responds with combined ACK and completion acknowledgement message 922. Finally, the Home Node acknowledges completion of the transaction associated with message 924. In this manner, the data processing system recovers from the error associated with message 916 and normal operation may continue.

Figure 10:
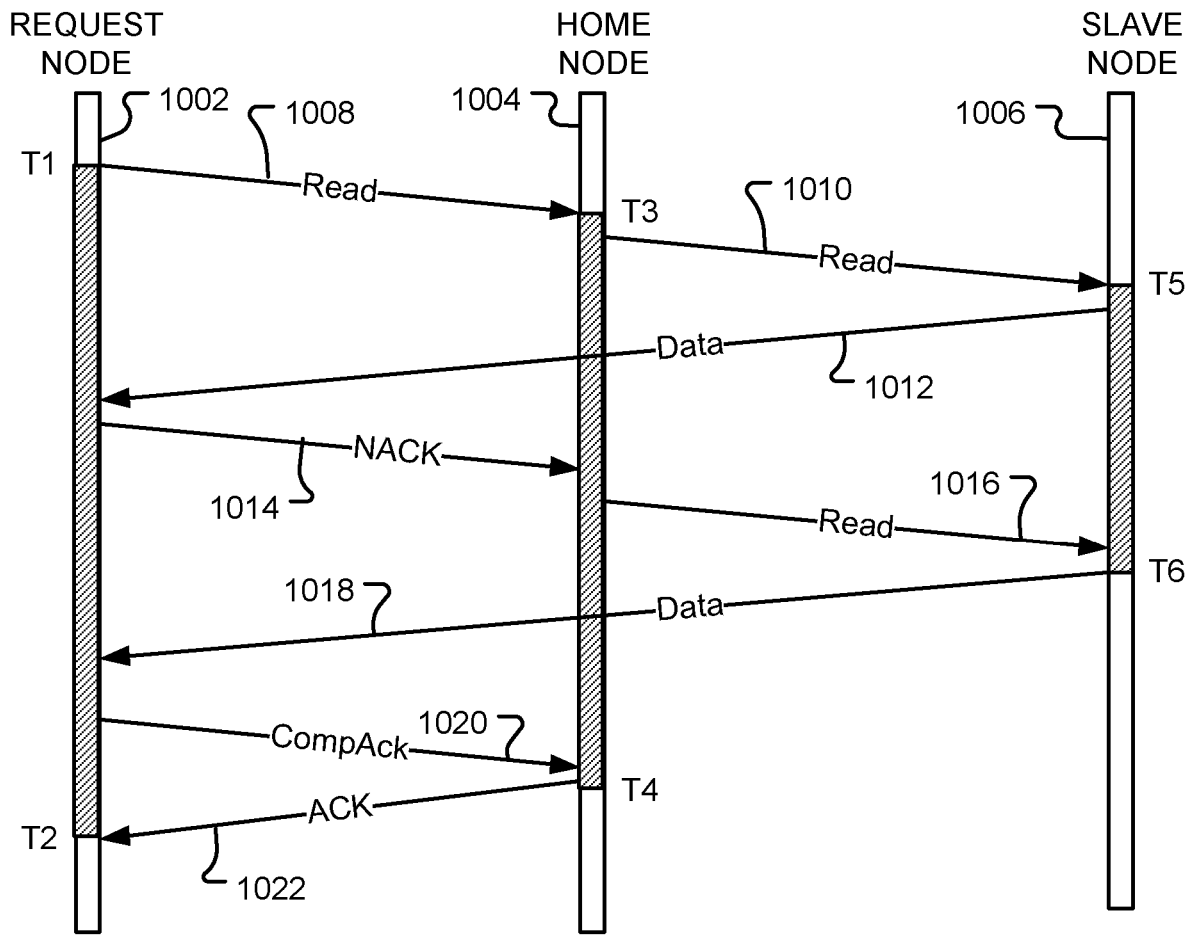

FIG. 10 is a further transaction flow diagram for a data read transaction where the requested data is stored in a memory and accessed via a Slave Node. In FIG. 10, vertical bars 1002, 1004 and 1006 show time lines for a Request Node, Home Node and Slave Node, respectively, with time flowing from top to bottom. The Request Node issues a Read request 1008 to the Home Node for data associated with a data address. The Home Node sends a read request 1010 to the Slave Node for the data. The Slave Node retrieves the data from memory and sends the data to the Request Node in message 1012. In this example, an error occurs and the first Request Node sends a no-acknowledgement in message 1014 to the Home Node. In response, the Home Node resends the read request to the Slave Node in message 1016. The data is resent to the Request Node in message 1018. This time, the data is received without error and the first Request Node responds with combined ACK and completion acknowledgement message 1020 to the Home Node. Finally, the Home Node acknowledges completion of the transaction in message 1022. In this manner, the data processing system recovers from the error associated with message 1012 and normal operation may continue.

Figure 11:
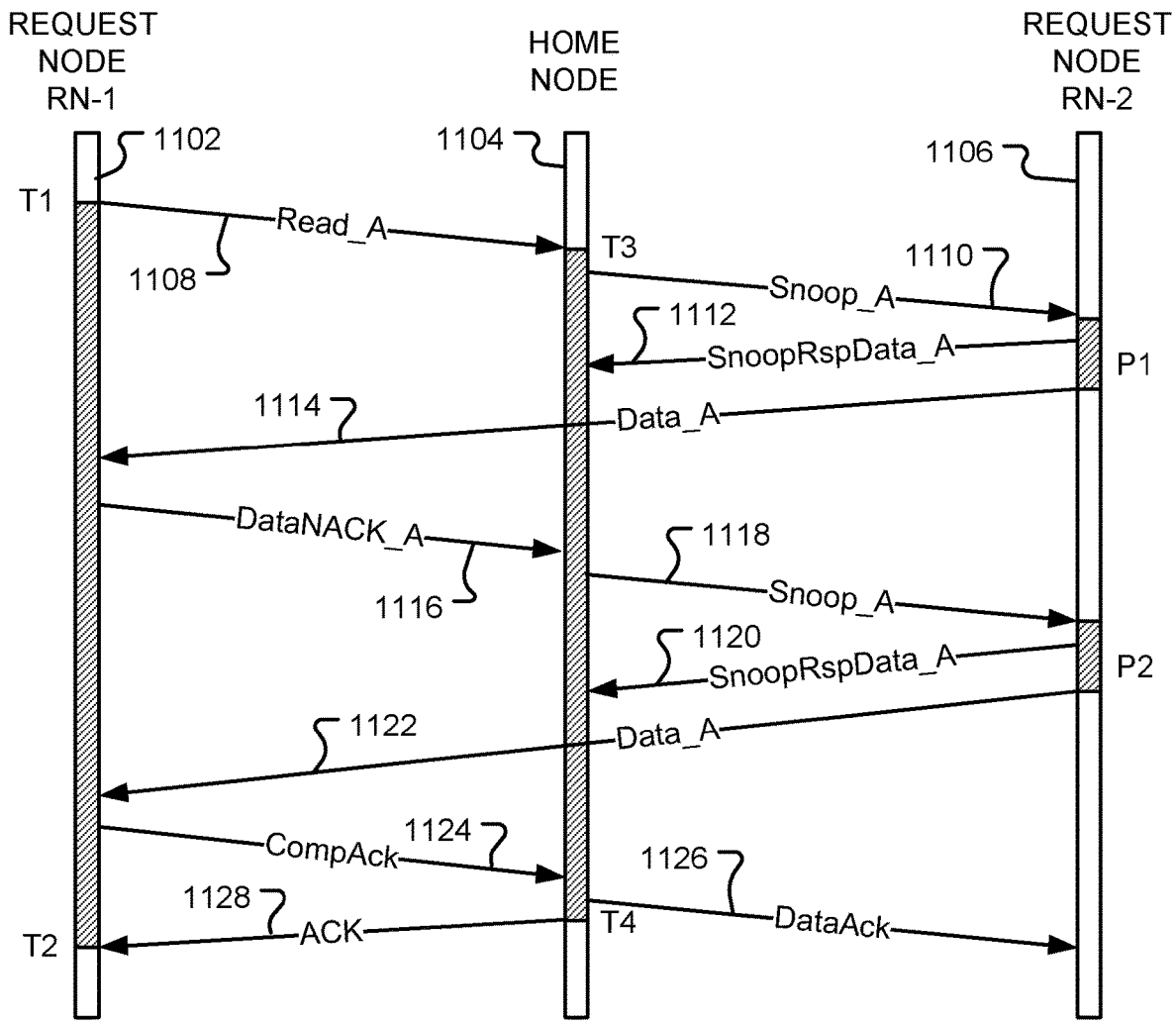

FIG. 11 is a transaction flow diagram for a data read transaction, where the requested data is stored in a cache of a Request Node and transferred via Direct Cache Transfer (DCT). In FIG. 11, vertical bars 1102, 1104 and 1106 show time lines for a first Request Node (RN 1), Home Node (HN) and second Request Node (RN 2), respectively, with time flowing from top to bottom. Request Node RN-1 issues Read request 1108 to the Home Node for data associated with a data address 'A'. The Home Node sends a Snoop request 1110 to the second Request Node. The second Request Node responds with response 1112 to the Home Node that is an acknowledgement in combination with a Snoop response indicating that the second Request Node has a copy of the requested data in its local cache. The second Request Node sends the requested data directly to the first Request Node in message 1114, bypassing the Home Node. In this example, an error occurs and the first Request Node sends a no-acknowledgement in message 1116 to the Home Node. In response, the Home Node resends the Snoop request in message 1118. Again, the second Request Node sends a snoop response to the Home Node in message 1120 and sends the data to the first Request Node in message 1122. This time, the data is received without error and the first Request Node responds with combined ACK and completion acknowledgement message 1124 to the Home Node. The requested data has been retrieved from a local cache of the second Request Node (RN-2). If the requested data is in a 'dirty' coherence state, that is, the data does not match corresponding data stored in the memory, the Home Node sends data acknowledgement message 1126 (DataAck) to RN-2. This message signals to RN-2 that transaction is complete and that RN-2 may deallocate storage for the requested data. Finally, the Home Node acknowledges completion of the transaction associated with message 1128. In this manner, the data processing system recovers from the error associated with message 1114 and normal operation may continue. In FIGS. 11, P1 and P2 denote the tenure periods for the second Request Node.

Figure 12:
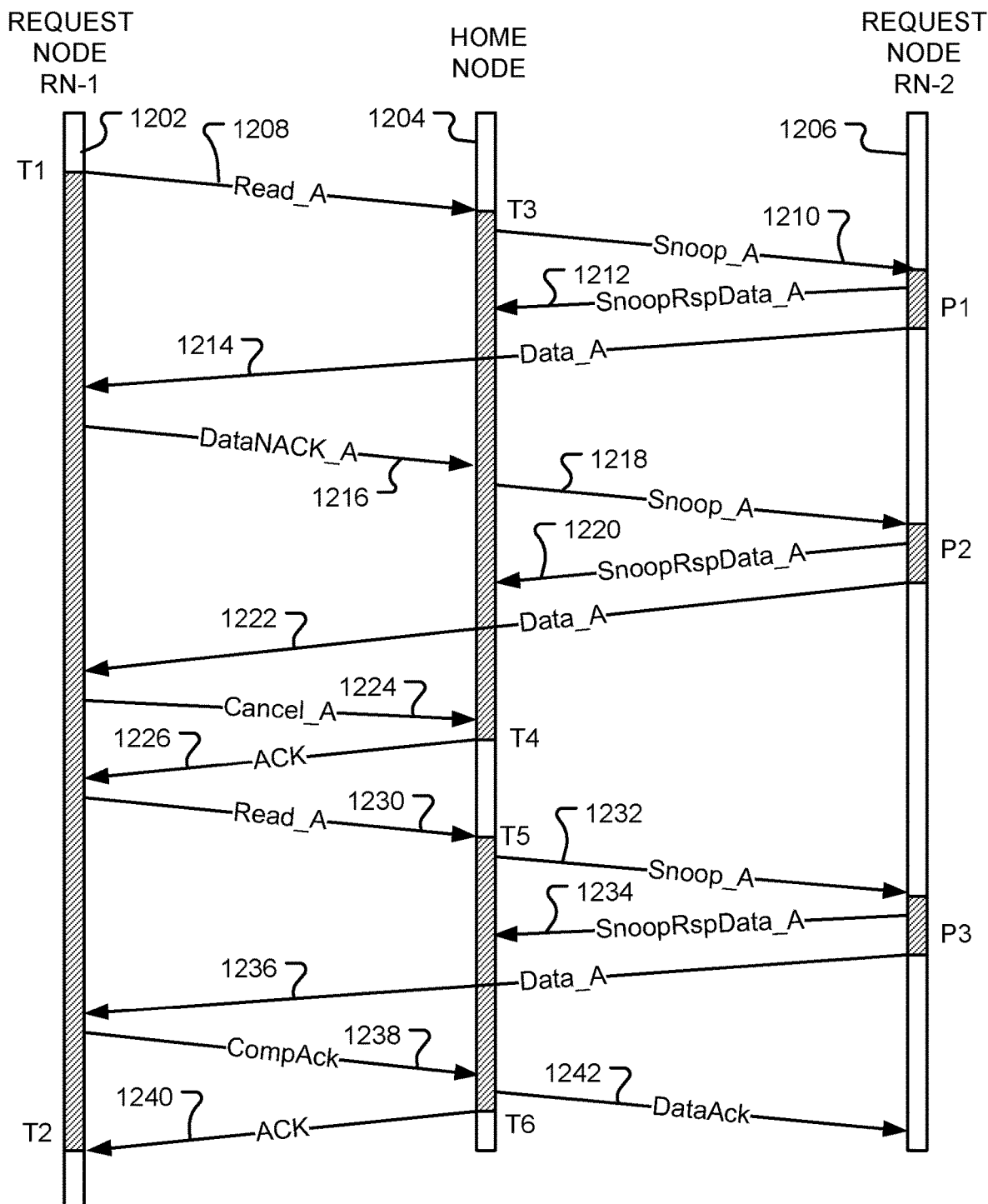

FIG. 12 is a further transaction flow diagram for a data read transaction, where the requested data is stored in a cache of a Request Node and transferred via Direct Cache Transfer (DCT). In FIG. 12, vertical bars 1202, 1204 and 1206 show time lines for a first Request Node (RN-1), Home Node (HN) and second Request Node (RN-2), respectively, with time flowing from top to bottom. Messages 1206-1222 follow the same sequence as in FIG. 11. The Request Node RN-1 issues Read request 1208 to the Home Node for data associated with a data address 'A'. The Home Node sends a Snoop request 1210 to the second Request Node. The second Request Node responds with response 1212 to the Home Node that is an acknowledgement in combination with a Snoop response indicating that the second Request Node has a copy of the requested data in its local cache. The second Request Node sends the requested data directly to the first Request Node in message (1214), bypassing the Home Node. In this example, an error occurs, and the first Request Node sends a no-acknowledgement in message 1216 to the Home Node. In response, the Home Node resends the Snoop request in message 1218. Again, the second Request Node sends a snoop response to the Home Node in message 1220 and resends the data to the first Request Node in message 1222. In this example, the first Request Node determines that the transaction should be cancelled and sends cancellation request 1224 to the Home Node. The Home Node acknowledges the cancellation in message 1226. Subsequently, the first Request Node may reissue the read request in message 1230. Again, the Home Node snoops the second Request Node in message 1232, the second Request Node responds in message 1234 and resends the data directly to the first Request Node in message 1236, in a Direct Cache Transfer (DCT). Completion is acknowledged in messages 1238 and 1240. The requested data has been retrieved from a local cache of the second Request Node (RN-2). If the requested data is in a 'dirty' coherence state, that is, the data does not match corresponding data stored in the memory, the Home Node sends data acknowledgement message 1242 (DataAck) to RN-2. This message signals to RN-2 that transaction is complete and that RN-2 may deallocate storage for the requested data. In FIG. 12, P1, P2 and P3 denote the tenure periods for the second Request Node. In this manner, a Request Node may cancel an incomplete transaction and thus avoid deadlock type errors.

The disclosed mechanisms may be implemented using hardware components such as special purpose hardware, dedicated hard wired logic, and/or dedicated processors or their equivalents. In particular the mechanisms may be implemented in the micro-architecture of the data processing network. The mechanisms may be implemented by a state machine that has no stored program instructions, or in one or more application specific integrated circuits (ASICs), in which each function or some combinations of certain of the functions are implemented as custom logic. Of course, a combination of these approaches could be used.

The data processing network disclosed above, or a component thereof, may be described by instructions of a hardware description language. Such instructions may be stored in a non-transient computer readable medium, for example. Such components may be combined with other components to form one or more integrated circuits.

Similarly, the data processing network disclosed above, or a component thereof, may be described by a netlist of components and connections stored in a non-transient computer readable medium, for example.

Those skilled in the art will appreciate that the processes described above can be implemented in any number of variations without departing from the present disclosure. For example, the order of certain operations carried out can often be varied, additional operations can be added or operations can be deleted without departing from the invention. Such variations are contemplated and considered equivalent.

Accordingly, some aspects and features of the disclosed embodiments are set out in the following numbered items:

1. A method for fault recovery in an interconnect circuit of a data processing network, the method comprising: sending, by a first node of the data processing network, a protocol message to a second node of the data processing network via the interconnect circuit, detecting, by the second node, when a fault has or has not occurred in the protocol message; sending, by the second node, a negative-acknowledgement message to the first node when a fault is detected in the protocol message; and responsive to the negative-acknowledgement message, the first node re-transmitting the protocol message to the second node.

2. The method of item 1, further comprising: sending, by the second node, an acknowledgement message to the first node when no fault has occurred in the protocol message.

3. The method of item 2, further comprising the second node combining the acknowledgement message with an expected response to the protocol message.

4. The method of item 1, further comprising the second node combining the negative-acknowledgement message with an expected response to the protocol message.

5. The method of item 1, further comprising the second node replacing an expected response to the protocol message with the negative-acknowledgement message when a fault has occurred in the protocol message.

6. The method of item 1, where the first node comprises a Request Node, the second node comprises a Home Node and the protocol message comprises a Read request or a completion acknowledgement response.

7. The method of item 1, where the first node comprises a Request Node, the second node comprises a Home Node and the protocol message comprises a Write-back request, the method further comprising combining, by the Home Node, the acknowledgement or negative-acknowledgement message with a completion and write data buffer credit message.

8. The method of item 1, where the first node comprises a Request Node, the second node comprises a Home Node and the protocol message comprises a Write request, the method further comprising combining, by the Home Node, the acknowledgement or negative-acknowledgement message with a write data buffer credit message.

9. The method of item 1, where the first node comprises a Home Node, the second node comprises a Slave Node and the protocol message comprises a Read request.

10. The method of item 1, where the first node comprises a Request Node, the second node comprises a Home Node and the protocol message comprises data to be written to a memory, the method further comprising combining, by the Home Node, an acknowledgement message or a negative-acknowledgement message with a completion message.

11. The method of item 1, where the first node comprises a Home Node, the second node comprises a Request Node and the protocol message comprises a Snoop request, the method further comprising combining, by the Request Node, an acknowledgement message or the negative-acknowledgement message with a Snoop response.

12. The method of item 1, where the first node comprises a Home Node, the second node comprises a Request Node and the protocol message comprises a Snoop request, the method further comprising combining, by the Request Node, an acknowledgement message or the negative-acknowledgement message with a Snoop response and a Data response.

13. The method of item 1, where the first node comprises a Home Node, the second node comprises a Request Node and the protocol message comprises a Data response, the method further comprising combining, by the Request Node, an acknowledgement message or the negative-acknowledgement message with a completion and acknowledgement response.

14. The method of item 1, where the first node comprises a Slave Node, the second node comprises a Request Node and the protocol message comprises a Data response.

15. A fault tolerant data processing network comprising: an interconnect circuit; and a plurality of nodes intercoupled through the interconnect circuit, the plurality of nodes comprising: a first node, where a micro-architecture of the first node is configured for sending a protocol message to the interconnect circuit; and a second node, where a micro-architecture of the second node is configured for receiving the protocol message from the interconnect circuit, detecting when a fault has or has not occurred in the protocol message, sending a negative-acknowledgement message to the first node when a fault is detected occurred in the protocol message, where the first node is configured for re-transmitting the protocol message to the second node responsive to the negative-acknowledgement message.

16. The fault tolerant data processing network of item 15, where a micro-architecture of the second node is further configured to send an acknowledgement message to the first node when no fault is detected in the protocol message.

17. The fault tolerant data processing network of item 15, where the micro-architecture of the first node is further configured for buffering the protocol message at least until a corresponding acknowledgement message or a negative-acknowledge message is received from the second node.

18. The fault tolerant data processing network of item 15, where the micro-architecture of the second node is further configured for combining the acknowledgement message or a negative-acknowledge message with an expected response to the protocol message.

19. The fault tolerant data processing network of item 18 where the expected response comprises: a Snoop response, by a Request Node, to a Snoop request, a completion acknowledgement response, by a Request Node, to a Data message, a completion and write data buffer credit response, by a Home Node, to a Write-back request, a write data buffer credit response, by a Home Node, to a Write request, or a completion response, by a Home Node, to a Data message.

20. The fault tolerant data processing network of item 18, where the micro-architecture of the second node is further configured for combining the negative-acknowledge message with an expected response to the protocol message when the fault is detected in the protocol message.

21. A non-transient computer readable medium containing instructions of a hardware description language descriptive of the fault tolerant data processing network of item 15.

22. A non-transient computer readable medium containing a netlist description of the fault tolerant data processing network of item 15.

23. A method for fault recovery in an interconnect circuit of a data processing network, the method comprising: sending, by a first Request Node of the data processing network, a read request to a Home Node of the data processing network via the interconnect circuit; responsive to the read request, the Home Node initiating transmission of data requested by the read request to the first Request Node; detecting, by the first Request Node, when a fault has or has not occurred in a response to the read request; sending, by the first Request Node, a negative-acknowledgement message to the Home Node when a fault has occurred in the response to the read request; and responsive to the negative-acknowledgement message, the Home Node again initiating transmission of the data requested by the read request to the first Request Node.

24. The method of item 23, where the Home Node initiating transmission of data requested by the read request to the first Request Node comprising: sending, by the Home Node, a snoop request to a second Request Node of the data processing network; retrieving, by the second Request Node, the requested data from a local cache of the second Request Node; sending, by the second Request Node, the requested data to the Home Node; and sending, by the Home Node, the requested data to the first Request Node.

25. The method of item 24, further comprising, following successful receipt of the requested data by the first Request Node: when requested data is in a 'dirty' coherence state in the local cache of the second Request Node: sending, by the Home Node, a data acknowledgment message to the second Request Node; and responsive to the data acknowledgment message, the second Request Node deallocating storage for the requested data at the second Request Node.

26. The method of item 23, where the Home Node initiating transmission of data requested by the read request to the first Request Node comprising: sending, by the Home Node, a read request to a Slave Node of the data processing network; retrieving, by the Slave Node, the requested data from a memory; and sending, by the Slave Node, the requested data to the first Request Node.

27. The method of item 23, where the Home Node initiating transmission of data requested by the read request to the first Request Node comprising: sending, by the Home Node, a snoop request to a second Request Node of the data processing network; sending, by the second Request Node, the requested data to the first Request Node.

28. The method of item 27, further comprising, following successful receipt of the requested data by the first Request Node: sending, by the first Request Node, a completion data acknowledgment message to the Home Node; and the Home Node deallocating a snoop table entry for the requested data.

29. The method of item 28, further comprising, following successful receipt of the requested data by the first Request Node: when requested data is in a 'dirty' coherence state in the local cache of the second Request Node: sending, by the Home Node, a data acknowledgment message to the second Request Node; and responsive to the data acknowledgment message, the second Request Node deallocating storage for the requested data at the second Request Node.

30. The method of item 23 further comprising, when the first Request Node has detected a fault in response to one or more read requests: sending, by the first Request Node, a transaction cancellation request to the Home Node; sending, by the Home Node to the first Request Node, an acknowledgment of the cancellation request.

31. The method of item 30, further comprising: subsequent to receiving the acknowledgement of the cancellation request, the first Request Node resending the read request.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

We claim:
1. A fault tolerant data processing network comprising:
an interconnect circuit; and
a plurality of nodes of the data processing network intercoupled through the interconnect circuit, the plurality of nodes comprising:
a first Request Node, comprising a micro-architecture of the first Request Node configurable to:
send a read request to a Home Node via the interconnect circuit, detect when a fault has or has not occurred in a response to the read request, and
send a negative-acknowledgement message to the Home Node when a fault has occurred in the response to the read request;
the Home Node, comprising a micro-architecture of the Home Node configurable to:
initiate transmission of data requested by the read request to the first Request Node, responsive to the read request, the initiate transmission comprising:
send a snoop request to a second Request Node, and send the requested data to the first Request Node, and send, following successful receipt of the requested data by the first Request Node, a data acknowledgment message to the second Request Node when the requested data is in a 'dirty' coherence state in a local cache of the second Request Node; and the second Request Node, comprising the local cache of the second Request Node, and a micro-architecture of the second Request Node configurable to:

retrieve the requested data from the local cache of the second Request Node, send the requested data to the Home Node, and responsive to the data acknowledgment message, deallocate storage for the requested data at the second Request Node, the micro-architecture of the Home Node configured for re-transmitting the data requested by the read request to the first Request Node, responsive to the negative-acknowledgement message.

2. The fault tolerant data processing network of claim 1, where the micro-architecture of the first Request Node is further configured to send an acknowledgement message to the Home Node when no fault is detected in the requested data.

3. The fault tolerant data processing network of claim 1, where the micro-architecture of the Home Node is further configured for buffering the requested data at least until a corresponding acknowledgement message or a negative-acknowledge message is received from the first Request Node.

4. The fault tolerant data processing network of claim 1, where the micro-architecture of the first Request Node is further configured for combining the acknowledgement message or a negative-acknowledge message with an expected response to the requested data.

5. The fault tolerant data processing network of claim 4, where the expected response comprises a completion acknowledgement response, by a Request Node, to a Data message.

6. The fault tolerant data processing network of claim 4, where the micro-architecture of the first Request Node is further configured for combining the negative-acknowledge message with the expected response to the requested data when the fault is detected in the requested data.

7. A non-transitory computer readable medium containing instructions of a hardware description language descriptive of the fault tolerant data processing network of claim 1.

8. A non-transitory computer readable medium containing a netlist description of the fault tolerant data processing network of claim 1.

9. A method for fault recovery in an interconnect circuit of a data processing network, the method comprising:

sending, by a first Request Node of the data processing network, a read request to a Home Node of the data processing network via the interconnect circuit;

responsive to the read request, the Home Node initiating transmission of data requested by the read request to the first Request Node, the initiating transmission comprising:

sending, by the Home Node, a snoop request to a second Request Node of the data processing network, retrieving, by the second Request Node, the requested data from a local cache of the second Request Node, sending, by the second Request Node, the requested data to the Home Node, and sending, by the Home Node, the requested data to the first Request Node;

detecting, by the first Request Node, when a fault has or has not occurred in a response to the read request;

sending, by the first Request Node, a negative-acknowledgement message to the Home Node when a fault has occurred in the response to the read request;

responsive to the negative-acknowledgement message, the Home Node again initiating transmission of the data requested by the read request to the first Request Node; and following successful receipt of the requested data by the first Request Node:

when requested data is in a 'dirty' coherence state in the local cache of the second Request Node:

sending, by the Home Node, a data acknowledgment message to the second Request Node; and responsive to the data acknowledgment message, the second Request Node deallocating storage for the requested data at the second Request Node.

10. The method of claim 9, where the Home Node initiating transmission of data requested by the read request to the first Request Node comprising:

sending, by the Home Node, a read request to a Slave Node of the data processing network;

retrieving, by the Slave Node, the requested data from a memory; and sending, by the Slave Node, the requested data to the first Request Node.

11. The method of claim 9, further comprising, when the first Request Node has detected a fault in response to one or more read requests:

sending, by the first Request Node, a transaction cancellation request to the Home Node; and sending, by the Home Node to the first Request Node, an acknowledgment of the cancellation request.

12. The method of claim 11, further comprising:

subsequent to receiving the acknowledgement of the cancellation request, the first Request Node resending the read request.

13. A method for fault recovery in an interconnect circuit of a data processing network, the method comprising:

sending, by a first Request Node of the data processing network, a read request to a Home Node of the data processing network via the interconnect circuit;

responsive to the read request, the Home Node initiating transmission of data requested by the read request to the first Request Node, the initiating transmission comprising:

sending, by the Home Node, a snoop request to a second Request Node of the data processing network, and sending, by the second Request Node, the requested data to the first Request Node:

detecting, by the first Request Node, when a fault has or has not occurred in a response to the read request;

sending, by the first Request Node, a negative-acknowledgement message to the Home Node when a fault has occurred in the response to the read request;

responsive to the negative-acknowledgement message, the Home Node again initiating transmission of the data requested by the read request to the first Request Node; and following successful receipt of the requested data by the first Request Node:

sending, by the first Request Node, a completion data acknowledgment message to the Home Node, deallocating, by the Home Node, a snoop table entry for the requested data, and following successful receipt of the requested data by the first Request Node:

when a requested data is in a 'dirty' coherence state in the local cache of the second Request Node:

sending, by the Home Node, a data acknowledgment message to the second Request Node, and responsive to the data acknowledgment message, the second Request Node deallocating storage for the requested data at the second Request Node.

14. The method of claim 13, where the Home Node initiating transmission of data requested by the read request to the first Request Node comprising:

sending, by the Home Node, a read request to a Slave Node of the data processing network;

retrieving, by the Slave Node, the requested data from a memory; and sending, by the Slave Node, the requested data to the first Request Node.

15. The method of claim 13, further comprising, when the first Request Node has detected a fault in response to one or more read requests:

sending, by the first Request Node, a transaction cancellation request to the Home Node; and sending, by the Home Node to the first Request Node, an acknowledgment of the cancellation request.

16. The method of claim 15, further comprising:

subsequent to receiving the acknowledgement of the cancellation request, the first Request Node resending the read request.

* * * * *